F. F. HULTGREEN.
WHEEL RIM.
APPLICATION FILED SEPT. 25, 1915.
1,202,845.
Patented Oct. 31, 1916.
2 SHEETS—SHEET 1.
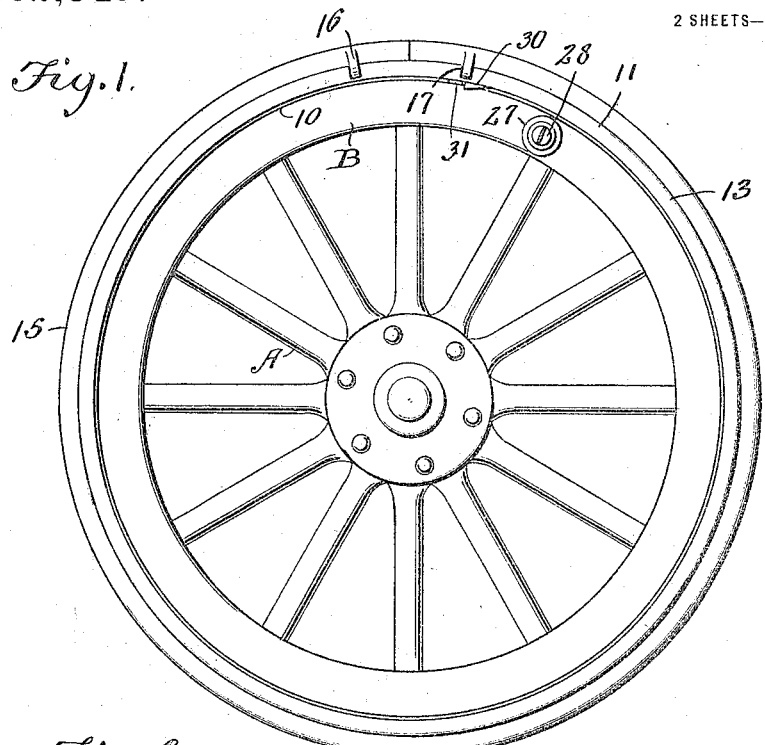
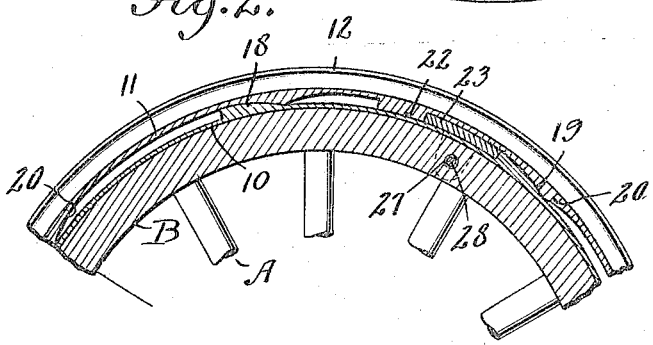
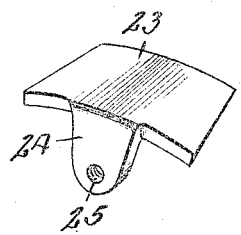
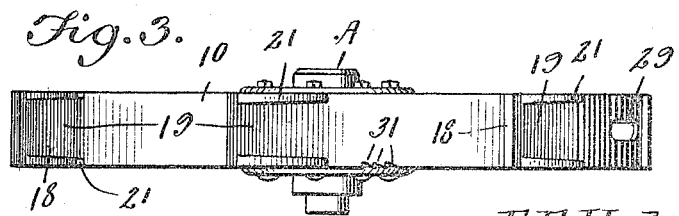
Inventor
F. F. Hultgreen,
By Victor J. Evans
Attorney
Witnesses F. F. HULTGREEN.
WHEEL RIM.
APPLICATION FILED SEPT. 25, 1915.
1,202,845. Patented Oct. 31, 1916.
2 SHEETS—SHEET 2.
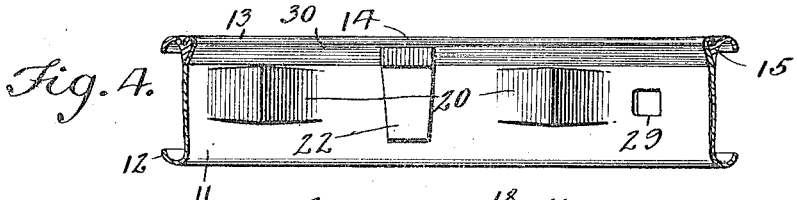
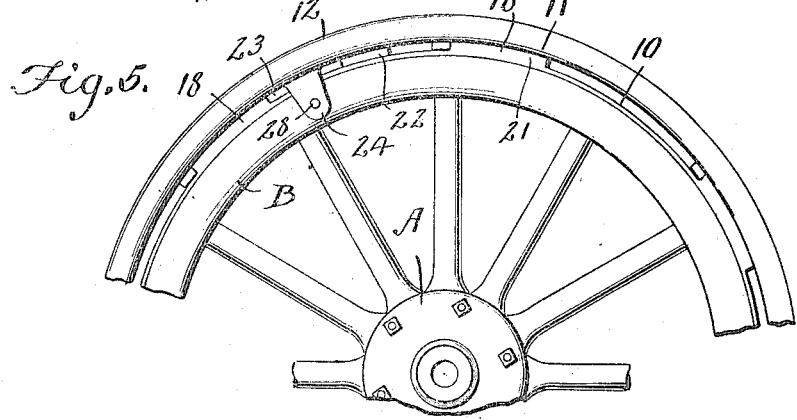
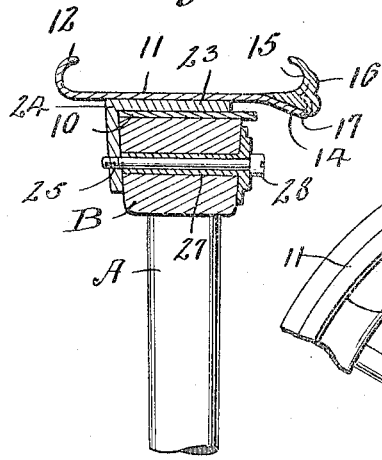
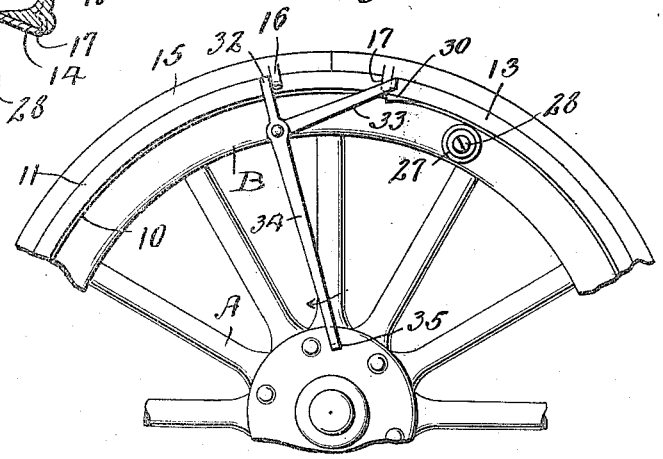
Witnesses
Inventor
F. F. Hultgreen,
By Victor J. Evans
Attorney

UNITED STATES PATENT OFFICE.

FRANK F. HULTGREEN, OF SOUTH BERKELEY, CALIFORNIA.

WHEEL-RIM.

1,202,845.  Specification of Letters Patent.  Patented Oct. 31, 1916.

Application filed September 25, 1915. Serial No. 52,708.

*To all whom it may concern:*

Be it known that I, FRANK F. HULTGREEN, a citizen of the United States, residing at South Berkeley, in the county of Alameda and State of California, have invented new and useful Improvements in Wheel-Rims, of which the following is a specification.

The invention relates to automobile wheel rims, preferably of the clencher type, and more particularly to the class of quick demountable rims.

The primary object of the invention is the provision of a rim of this character wherein the same is mounted on the felly of the wheel in a novel manner so that it may be quickly demounted and replaced as the occasion may require, and also which permits of the removal of the tire without demounting the rim supporting the same.

Another object of the invention is the provision of a rim of this character which is novel in construction, and is firmly and securely locked against creeping action or lateral displacement when supported upon the felly of the wheel.

A further object of the invention is the provision of a rim of this character wherein it may be reversed for the mounting thereof on the wheels at either side of the automobile, thereby making it interchangeable at will.

A still further object of the invention is the provision of a rim of this character which is extremely simple in construction to permit quick repairs or the placing of a new tire on the wheel, and also which is reliable and efficient in its purpose, strong, durable, and inexpensive in manufacture.

With these and other objects in view, the invention consists in the construction, combination and arrangement of parts as will be hereinafter fully described, illustrated in the accompanying drawings, and pointed out in the claim hereunto appended.

In the drawings:—Figure 1 is a side elevation of a vehicle wheel showing the rim constructed in accordance with the invention mounted thereon. Fig. 2 is a fragmentary longitudinal sectional view thereof. Fig. 3 is a plan view of the felly rim or annulus. Fig. 4 is a fragmentary inner face view of the rim. Fig. 5 is a fragmentary view similar to Fig. 1, looking toward the opposite side of the wheel. Fig. 6 is a perspective view of the locking wedge. Fig. 7 is a vertical transverse sectional view. Fig. 8 is a fragmentary side view showing the tool in position for releasing the detachable clencher flange hoop.

Similar reference characters indicate corresponding parts throughout the several views in the drawings.

Referring to the drawings in detail, A designates a vehicle wheel for automobiles of any ordinary well-known construction, and B its felly on which is supported the demountable rim hereinafter fully described. The quick demountable rim comprises a felly ring or annulus 10 which is concentrically disposed on the felly B and fastened securely thereto in any suitable manner. Concentrically arranged upon this ring or annulus 10 is a demountable rim section 11 having a permanent clencher flange 12 at one circumferential edge, and an abutment flange 13 at its opposite edge, while next to the latter and formed in the said section 11 is a channel 14 providing a seat for receiving the split separable flange hoop 15 which abuts against the said flange 13 and is adapted to coact with the flange 12 for the detachable fastening of a tire on the rim. The hoop 15 is resilient so as to snugly embrace the outer side of the rim 11, and is formed with outside locking lugs 16 arranged near the ends of the said hoop, and these lugs are adapted to become seated in notches 17 formed in the abutment flange 13 for the secure fastening of the flange hoop on the rim.

Formed on the outer face of the ring or annulus 10 at intervals thereof are cleats 18 each being formed with a tapering beveled surface 19 with which contact coacting correspondingly tapered stationary reversely beveled cam projections or wedging keys 20 formed at intervals on the inner face of the rim section 11, the beveled surfaces 19 on the cleats 18 forming side edge ribs 21 thereon to prevent the lateral displacement of the rim section 11 when engaged concentrically about the ring or annulus 10 on the felly B of the wheel. By slightly turning the rim section 11 upon the ring or annulus 10 the cam projections or keys 20 will frictionally ride onto the beveled surfaces 19 of the cleats 18 for the secure locking of the rim section 11 with the ring or annulus 10, and thereby fasten the rim on the wheel without possibility of the creeping of the rim during the travel of the wheel.

Spaced from one of the projections or keys 20 and formed on the inner face of the rim section 11 is an abutment block or lug 22 which coacts with one of the cleats 18 for the engagement therewith of a wedging plate 23 which is driven inwardly between the said blocks or lugs and the cleats 18 adjacent thereto when inserted between the ring or annulus 10 and the rim section 11 for the secure fastening of the said rim section thereon, the plate 23 being formed with a right angular ear 24 which rests against one side of the felly B and is formed with a threaded aperture 25 which is adapted to register with a transverse hole formed in the felly B, the said hole being fitted with a guide sleeve 27 through which is passed a bolt member 28, the latter being adapted to engage in the threaded hole 25, and in this manner the wedging plate 23 is fastened in position.

The felly B, ring or annulus 10, and the rim section 11 are formed with suitable slots 29 for the reception and passage of the tire valve therethrough when the tire is detachably mounted upon the rim section 11 of the demountable rim.

Formed at one end of the block or lug 22 is a fulcrum shoulder 30 against which is adapted to engage a suitable tool for the turning of the rim section 11 after the wedging plate 23 has been removed, while formed in the edge of the ring or annulus 10 at the point of the shoulder 23 is a series of notches 31 adapted to receive the tool to prevent the slipping thereof when acting upon the shoulder to turn the rim section 11 on the ring or annulus 10 for the demounting of the rim.

In Fig. 8 there is shown a tool for the fastening of the clencher hoop 15 on the rim section, and also for the demounting of the said rim section from the ring or annulus 10, and this tool comprises the respective hook-like jaws 32 and 33, respectively, one of which is formed with a lever 34 to which the other jaw is pivoted, and this tool is shown applied in Fig. 8 of the drawings for the fastening of the clencher hoop upon the rim section, while the end of the lever 35 is adapted to engage the shoulder 30 and any one of the notches 31 when it is desired to demount the rim.

The reversely beveled projections or keys 20 permit the interchanging of the demountable rim upon the wheels of an automobile upon opposite sides thereof, as will be clearly apparent.

What is claimed is:—

A demountable wheel rim having keys formed at intervals on the inner face thereof for the detachable securing of the rim upon the body of a wheel, each key being formed with reversely beveled and reversely tapered portions.

In testimony whereof I affix my signature in presence of two witnesses.

FRANK F. HULTGREEN.

Witnesses:
PHIL SHERIDAN,
W. C. MORAN.

Copies of this patent may be obtained for five cents each, by addressing the "Commissioner of Patents, Washington, D. C."